United States Patent [19]

Trundle et al.

[11] Patent Number: 5,080,931
[45] Date of Patent: Jan. 14, 1992

[54] DOPED POLYMER FILMS FOR WAVEGUIDES

[75] Inventors: Clive Trundle, Silverstone; Martin J. Goodwin, Northants; Robert Baker-Glenn, Kingsthorpe; Jack Brettle, Greens Norton; Neil Carr, New Duston, all of England

[73] Assignee: Plessey Overseas Limited, Essex, United Kingdom

[21] Appl. No.: 185,660

[22] Filed: Apr. 25, 1988

[30] Foreign Application Priority Data

Apr. 24, 1987 [GB] United Kingdom ............... 8709760

[51] Int. Cl.⁵ ............................................. B05D 5/00
[52] U.S. Cl. .................................. 427/164; 427/240; 427/282; 427/336; 427/340; 427/393.5; 427/412.1
[58] Field of Search ............ 427/164, 240, 307, 393.5, 427/322, 336, 340, 412.1, 282; 350/96.12

[56] References Cited

U.S. PATENT DOCUMENTS

| | | | |
|---|---|---|---|
| 3,767,445 | 10/1973 | Chandross et al. | 350/96.12 |
| 3,809,732 | 5/1974 | Chandross et al. | 350/96.12 |
| 3,838,905 | 10/1974 | Irie | 350/96.12 |
| 3,839,067 | 10/1974 | Sosnowski et al. | 350/96.12 |

FOREIGN PATENT DOCUMENTS

| | | |
|---|---|---|
| 1362757 | 8/1974 | United Kingdom . |
| 2102145 | 1/1983 | United Kingdom . |
| 2189624 | 10/1987 | United Kingdom . |

OTHER PUBLICATIONS

"Electron Letters" by Goodross et al., 22, 789 (1986).

Primary Examiner—Janyce Bell
Attorney, Agent, or Firm—Sughrue, Mion, Zinn, Macpeak & Seas

[57] ABSTRACT

A method of forming optical waveguides is described in which a film of a novolac resin is deposited on a transparent substrate and a dopant material is incorporated into the film during or after the coating step. Additional quantities of the same or different dopant may be incoporated into the dried film by solvent assisted indiffusion.

6 Claims, 5 Drawing Sheets

Fig. 3

Fig. 5

DOPED POLYMER FILMS FOR WAVEGUIDES

DOPED POLYMER FILMS FOR WAVEGUIDES

The present invention relates to optical waveguides and is particularly concerned with the fabrication of waveguide structures using selected polymers.

Interest has recently focussed on the development of optical waveguides which are partly or wholly formed from organic materials rather than the more traditional inorganic materials such as glasses—see for example the paper by Goodwin, Glenn & Bennion : Electron Lett. 22, 789 (1986). Although many of the polymers which have been investigated for this purpose, e.g. polymethyl methacrylate (PMMA) have good optical properties, they suffer from the disadvantage that they do not possess a high capacity for dissolving dopant materials, such as photochromic materials or compounds, such as nitroanilines, which exhibit a high degree of optical non-linearity.

The present invention is based on the observation that certain phenolic-formaldehyde resins exhibit a high solvent power towards a variety of organic materials having actual or potential usefulness as dopants.

According to one aspect of the present invention there is provided a method of forming a waveguide which comprises coating onto a transparent substrate a film of a phenolic-aldehyde resin and incorporating an optical modifying material into the film during the coating step or after formation of the film.

Preferably, the phenolic-aldehyde resins used in the formation of the coated film are condensation products of phenol and formaldehyde. However, substituted phenols may be used, such as ortho- or para-cresol, provided they are not substituted in the meta position. It is also possible to employ aldehydes other than formaldehyde, e.g. furfural.

The preferred resins are novolac resins. These are low-molecular weight (e.g. molecular weight 500 to 5000), thermoplastic resins. Novolac resins can be formed by reacting a phenol with an aldehyde in a mole ratio of aldehyde to phenol in the range of about 0.75 to 0.85, in the presence of an acid catalyst. The condensation reaction is completed within about 6 to 8 hours at 90 to 100° C. and the volatiles, including any residual phenol are removed by vacuum stripping at 140° to 170° C. If a strong acid catalyst is used the resulting resin may require neutralization.

Novolac resins of the kind which are used commercially in the preparation of photoresists have been found to be suitable.

Typical novolac resins are described in the Encyclopedia of Polymer Science and Engineering, Volume 11, pages 51 to 92. Suitable resins have a glass transition temperature of 45° to 170° C. and a formaldehyde-phenol molecular ratio between 0.5 and 0.8. Two typical resins are described on page 52 of the above reference, which have glass transition temperatures of 48° and 65° C. and gel times of 25 and 75 seconds at these temperatures.

The optical modifying material (which is referred to for convenience as a 'dopant') may be any dopant material which changes the refractive index of the phenolic-aldehyde resin. Preferably, the dopant also exhibits some intrinsic non-linear property. More than one material can be incorporated into the film at the same time or in separate steps. For example, one dopant material may be incorporated into the film during the coating step and a second material introduced subsequently into the resultant dried film, e.g. by diffusion from solution.

Novolac resins are capable of dissolving large amounts of dopant materials. Thus, novolac resins are typically able to dissolve more than 65 parts by weight of nitroaniline per 100 parts by weight of the resin. Other compounds with potentially useful optical properties such as Beta-carotene, are soluble in amounts of 20 parts per 100 parts by weight of such resins.

In order that the full solvating power of the novolac resins may be utilized, it is desirable to dissolve the novolac and the dopant in a strong common solvent for coating. In the case of nitroanilines, an excellent solvent is dimethyl-formamide (DMF), and 2-methoxy methyl ether (diglyme) which is also a good solvent for novolac resins.

Although the waveguide film may be formed in various ways, e.g. by dip-coating as described in U.K. Patent No. 2189624 (WO.87/06715 - U.S. patent application Ser. No. 141,665, filed Dec. 28, 1987, now U.S. Pat. No. 4,838,634. . . . . . . . . . ), the disclosure of which is incorporated herein, the preferred technique for depositing the film is by spin-coating. Spin-coating enables thin films (e.g. from about 1 to 7 microns thick) having a high degree of flatness to be obtained. Generally, the selected dopant or dopants and the novolac resin are dissolved in a suitable common solvent, filtered, and deposited onto a flat, transparent substrate. The substrate is spun, e.g. at a rotational speed of about 2,500 to 6,000 rpm for about 40 to 20 seconds. The film is then heated, e.g. at a temperature between about 40° and 100° C. to evaporate the solvent and give the resin a soft bake.

CHOICE OF SUBSTRATE

In principle, any clear material which can be polished to a hard, flat surface is suitable for use as a substrate in the present invention. Desirably, the substrate material has good thermal and optical properties. The preferred substrate material is glass but clear polymer materials which can be cut and polished may also be used.

Polymer substrates may be selected from any polymers which have good optical and thermal properties. Examples of polymers which may be selected are polycarbonates, polyesters, polystyrene, vinylidene difluoride polymers and polyalkyl acrylates and methacrylates. The selected polymer should not be dissolved or swelled significantly by the solvent for the novolac resin.

A suitable polymer material is CR 39, poly diethylene glycol bis (allyl carbonate), which is obtainable from P.P.G. Limited as a curable polymer. Preparation of optically clear flat sheets in CR 39 polymer is described in U.S. Pat. No. 2,542,386.

Other factors which influence the choice of the polymer include the ability of the polymer to be cut and polished. In general, cross-linkable polymers such as CR39 can be polished to provide satisfactory thin flat substrates.

Polymers which can be shaped, e.g. by extrusion or by moulding or casting are also advantageous. Thus, for example, polyvinylidene difluoride and copolymers of vinylidene difluoride with trifluoroethylene can be extruded or moulded and also cast from solution in common solvents.

CHOICE OF DOPANT

The dopant selected should primarily be capable, when incorporated into the novolac film, of raising the refractive index. In general, dopants are preferred which exhibit intrinsic non-linearity.

Advantageously, the dopants are selected from organic compounds with high values of quadratic or cubic hyperpolarisability. A large value for quadratic or hyperpolarisability, which generally implies a corresponding high value for cubic hyperpolarisability, is easily measured (see Schmidt et al, Appl. Phys. Lett. 25, 458 (1974).

The organic dopants which are most effective tend to be compounds having large dipole moments. For example, the dopants may be selected from aryl compounds having amino, nitro, hydroxy and/or alkoxy substituents, such as anilines and aniline derivatives. Specific examples of this class of compounds are, m-nitroaniline (mNA), o-nitroaniline (oNA), 2-chloro-4-nitroaniline (ClNA) and 1-dimethylamino-2-acetamido-4-nitrobenzene (DAN).

Photochromic materials may also be employed as dopants.

Dopants may also be selected from compounds having a heterocyclic nitrogen-containing ring, such as pyrazoline derivatives, and from compounds being extended conjugated systems extending between dipoles, such as azo dyes.

The book entitled "Non-linear optical properties of organic and polymer materials" edited by D. J. Williams and published 1983 by the American Chemical Society as No. 233 in the A.C.S. Symposium series may be consulted for additional examples of compounds and polymers which exhibit non-linear optical properties. Chaper 3 of this book written by Robert J. Twieg and Kauti Jain may be consulted for further examples of compounds which exhibit high beta values.

The dry, doped films produced by the method of the invention can be further treated by solvent-assisted indiffusion as described in U.K. Patent Specification No. 2189624 (WO/87/06715, U.S. patent application Ser. No. 141,665, filed Dec. 28, 1987, now U.S. Pat. No. 4,838,634 . . . . . . . . ), to introduce another dopant or a higher concentration of the same dopant into the waveguide film.

Alternatively, a dry undoped novolac film can be formed on a substrate and the solvent-assisted indiffusion technique employed to introduce one or more dopants into the film.

Channel waveguide structures can be formed by applying a dopant using lithographic and dyeing techniques.

In essence, solvent-assisted indiffusion involves contacting the surface of the dry novolac film with a two-phase system comprising the dopant and a saturated solution of the dopant. The solvent acts as a transfer medium which allows the dopant molecules to come into contact with the surface of the film at a constant rate while at the same time giving an even distribution over the novolac film. Presence of solid dopant suspended in the solution ensures a constantly saturated solution and steady state conditions. Dopant molecules reaching the surface of the novolac film face a choice between continued solvation and entry into the film to form a solid solution. Molecules which do enter the surface may then diffuse further into the matrix. Ideally, a large dopant concentration should be achieved near the surface but not penetrate far into the bulk polymer of the film. This would give an effective waveguide with good non-linear properties (depending on the nature of the organic dopant), but would avoid the creation of a thick waveguide supporting many modes.

In effect, a surface layer is formed in the polymer matrix forming the novolac film which is doped with the organic compound to such an extent that there is a local increase in refractive index in the thickness of the doped film. The technique of introducing a dopant into a polymer film by imbibition from a solution in an inert solvent can be controlled to enable the degree of change in refractive index and the depth of penetration of the organic compound to be varied. The main factors which determine these features of the resulting waveguide are: (a) the nature of the organic compound and of the solvent, (b) the solution concentration, (c) the treatment time, (d) the precise nature of the novolac and the relative affinity of the dopant for the solvent and the novolac resin, (e) the temperature of treatment, (f) the nature of any pretreatment and (g) the presence of other substances, such as surfactants, in the solution which assist the absorption of the organic dopant into the resin. In general, organic compounds which have a higher affinity for the resin will be imbibed more quickly and to a greater depth. Higher temperatures, higher concentration and longer treatment times all contribute to a greater degree of penetration of the compound into the resin film.

In practice, the substrate and adherent novolac film are normally immersed in a saturated solution of the dopant. A vessel is charged with a sufficient amount of solution to cover the structure and heated with stirring to the required temperature. A condenser may be necessary if the temperature used is likely to cause excessive solvent evaporation. The temperature is best maintained by means of a thermostatted bath or by reflux of the solvent. Sufficient dopant is added to give a saturated solution with a small excess and the system allowed to equilibrate. The structure is immersed in the solution for the required time. Provided the solution is stirred, solid dopant particles in suspension do not normally affect the process, but if the dopant is molten at the temperature used, care must be taken that the resin film is not wetted directly by dopant droplets; otherwise an uneven indiffusion is obtained. Usually, swirling will cause any droplets to adhere to the sides of the vessel, the substrate and its novolac film may then be introduced. Where uneven indiffusion does occur because of particles sticking to the surface of the resin film, the cause is often static electricity. Pretreatment before immersion with an anti-static gun is normally effective in overcoming this problem. After immersion, the resin film may be cooled, washed and dried.

In general, the waveguides produced exhibit low loss, good surfaces, little scatter (due to the diffuse nature of the edge of the dopant boundary) and may support one or more modes depending on the depth to which the dopant is diffused.

CHOICE OF SOLVENT

The function of the solvent used in the solvent indiffusion process is to act essentially as a transport medium. It should be inert and should not dissolve or swell the substrate or resin film significantly. Although the dopant must be soluble in the solvent in order to make transference possible, the solubility product should be small. There are two reasons for this. First, transfer of the dopant from the solvent to the resin film depends upon its relative solubility in the solvent and novolac resin. A low affinity for the solvent coupled with a high affinity for the resin should encourage dopant molecules at the interface to enter the resin film. Secondly, a high solubility in the solvent would mean that a large amount of dopant would be taken up, whereas a low solubility means that a saturated solution may be maintained with only a little dopant.

A high-boiling dopant is also desirable, both for high temperature diffusion of the dopant, and for operation at low temperature (where vapour loss is minimised).

It has been found that perfluorinated organic solvents are advantageous solvents in the process of the invention. Most organic compounds are sparingly soluble in these solvents at elevated temperatures and a wide range of such solvents is available. They are inert, non-flammable and non-toxic and are commercially available from 3M Corporation (FC range of perfluorinated solvents) and from ISC Chemicals Ltd. (PP range).

The following Examples will illustrate the process of the present invention.

EXAMPLE 1

2-Methyl 4-nitroaniline (MNA) 6.4 grms) was dissolved in a solution of novolac (10 grms made up to 24 $cm^3$ with dimethylformamide (DMF)). The solution was filtered (0.5 $\mu m$) and coated onto a glass substrate by spinning the substrate at 4000 rpm for 30 secs. The film was allowed to dry in air at room temperature yielding a transparent, 4.2 $\mu m$ (microns) thick film.

EXAMPLE 2

Dimethylamino-2-acetamido-4-nitrobenzene (DAN) (2.0 grm) was dissolved in a hot solution of novolac (10 grms made up to 24 $cm^3$ with DMF). The hot solution was filtered (0.5 $\mu m$) and coated onto a glass substrate as above while hot, to avoid crystallisation of the solution. The resultant 4.0 $\mu m$ thick film was transparent showing no crystal formation.

The above procedure was repeated using the following dopant materials to produce waveguide films having the thickness and dopant concentrations shown in Table 1 below.

TABLE 1

| Example Number. | Dopant | Concentration* (Weight %) | Film Thickness ($\mu m$) |
|---|---|---|---|
| 3 | $C_2H_5$—N=⟨⟩=C—C=⟨⟩=O | 3.3 | 5.84 |
| 4 | $C_5H_{11}$—⟨⟩—⟨⟩—CN | 18.0 | 2.48 |
| 5 | $C_2H_5CHCH_2$—⟨⟩—⟨⟩—CN (with $CH_3$ branch) | 15.1 | 5.67 |
| 6 | $CH_3O$—⟨⟩—N-N=⟨⟩—⟨⟩—$NO_2$ | 2.2 | 5.65 |
| 7 | $CH_3O$—⟨⟩—N-N=⟨⟩—⟨⟩—CN | 1.3 | 4.97 |
| 8 | $CH_3O$—⟨⟩—N-N=⟨⟩—CH=CH—⟨⟩—$NO_2$ (with ⟨⟩—$NO_2$ substituent) | 3.4 | 5.42 |
| 9 | ⟨⟩—CHNH—⟨⟩—$NO_2$ (with $CH_3$, pyridine N) | 9.7 | 4.42 |

TABLE 1-continued

| Example Number. | Dopant | Concentration* (Weight %) | Film Thickness (μm) |
|---|---|---|---|
| 10 | 2-methyl-4-nitroaniline (NH₂, CH₃, NO₂ on benzene) | 14.5 | 5.28 |
| 11 | 2-chloro-4-nitroaniline (NH₂, Cl, NO₂ on benzene) | 16.4 | 4.81 |
| 12 | 3-nitroaniline (NH₂, NO₂ on benzene) | 9.9 | 5.93 |
| 13 | (pyrrolidinyl, NO₂, NHCOCH₃ on benzene) | 3.5 | 5.66 |
| 14 | (phenyl-pyrazoline-CH=C(CN)₂) | 4.2 | 1.88 |

In all cases the initial novolac polymer was used as a solution containing 31 wt. % polymer in 2-methoxyethyl ether (diglyme)
*Concentration relative to novolac polymer

EXAMPLE 15

2-Methyl-4-nitroaniline (0.4g) was dissolved in a solution (4.0 g) of novolac polymer (31 wt. %) in diglyme (2-methoxyethyl ether) to produce a clear, yellow solution. When spun on a glass substrate for 30 seconds at 5000 rpm, a film of thickness 1.30 m was produced.

EXAMPLE 16

1-dimethyl-2-acetamido-4-nitrobenzene (DAN) was dissolved in a solution of novolac resin (31 wt. %) in diglyme to produce three solutions as follows:
(a) 5.0 g novolac solution+0.07 g DAN, 4.3 wt.%.
(b) 5.0 g novolac solution+0.14 g DAN, 8.1 wt.%.
(c) 5.0 g novolac solution+0.20 g DAN, 11.5 wt.%.

Films of these solutions were prepared as above and baked at 50° C. overnight to remove any residual solvent.

Figure 1:
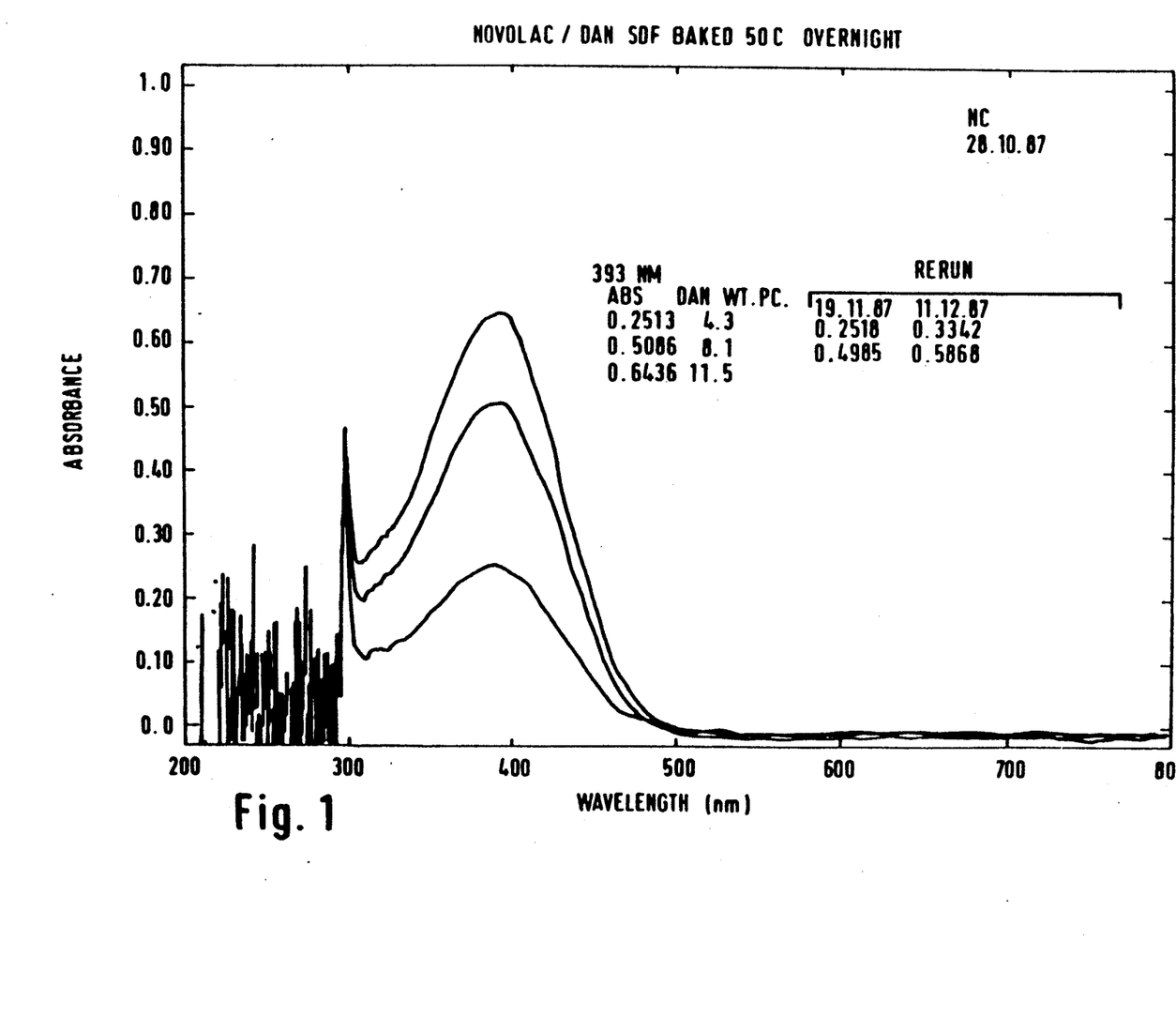

Absorbance data for these films is shown in FIG. 1. In FIG. 1, the upper curve shows the absorbance of the film containing 11.5 wt. % of DAN, the middle curve shows the absorbance behavior of the film containing 8.1 wt.% of DAN and the lower curve the absorbance of the 4.3 wt.% DAN film.

SOLVENT ASSISTED INDIFFUSION OF NOVOLAC

EXAMPLE 17

Figure 2:
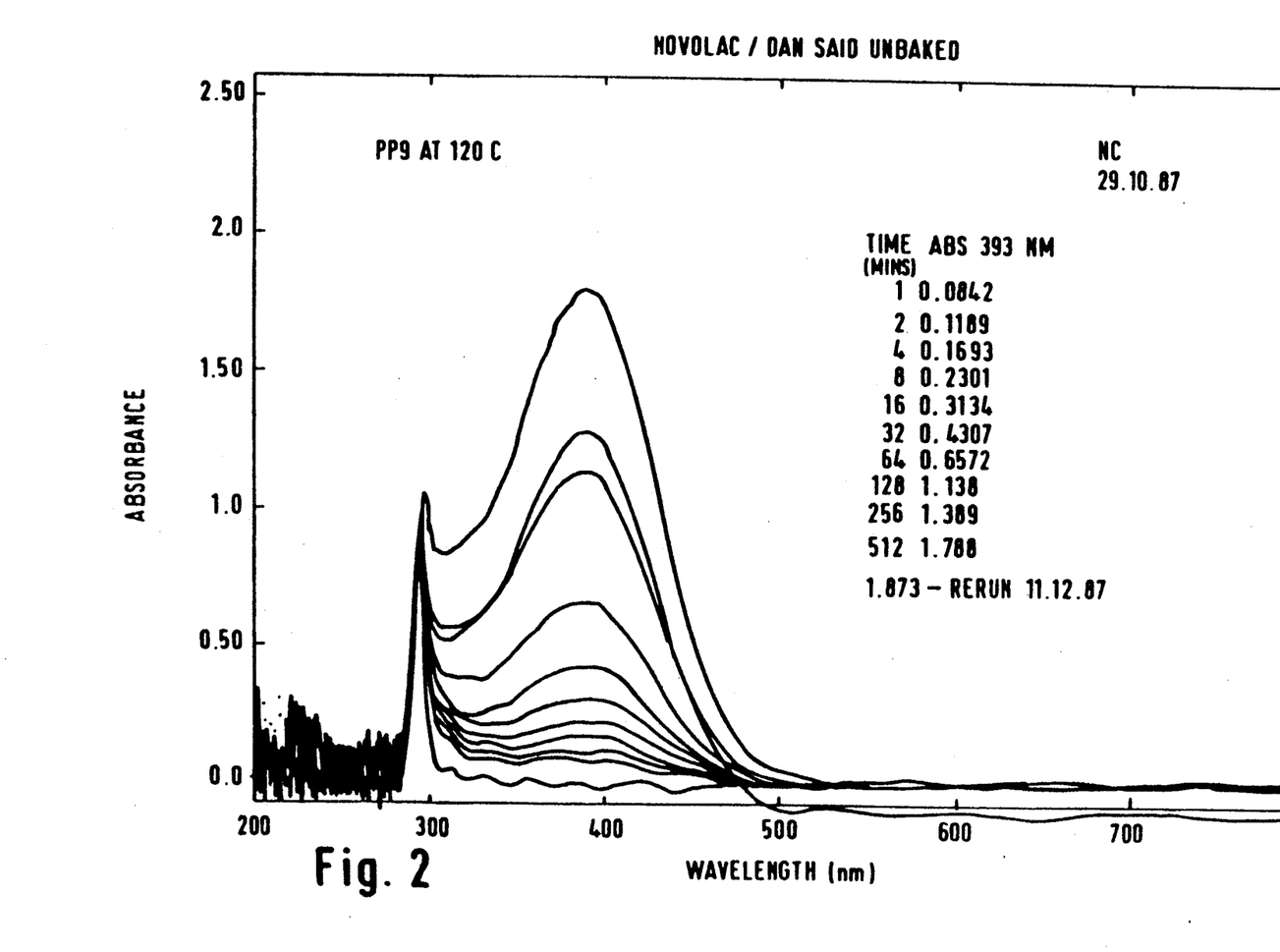

An undoped novolac film was prepared by spinning onto glass at 5000 rpm for 30 seconds. The indiffusion of DAN in PP9 (a commercial fluorocarbon solvent predominantly consisting of an isomeric mixture of perfluorinated isomers of 1-methyldecalin and boiling at 160° C.) at 120° C. was monitored with time by an increase in absorbance of DAN at 393 nm—see the absorbance spectrum in FIG. 2 The curves on FIG. 2 represent the absorbance of the film at times commencing 1 minute after immersion and doubling the immersion time after each measurement so that the final measurement was taken 512 minutes after immersion. The maximum DAN concentration can be calculated using the data for the spun doped DAN films. This value is estimated to be ~30 wt.%, i.e. much higher than is attainable by predoping.

EXAMPLE 18

The earlier described predoped DAN film of 11.5 wt. % was indiffused with further DAN dopant using similar conditions to those in Example 17. The final concentration (from predoping and indiffusion) is estimated to be ~40 wt.%.

EXAMPLE 19

Figure 3:
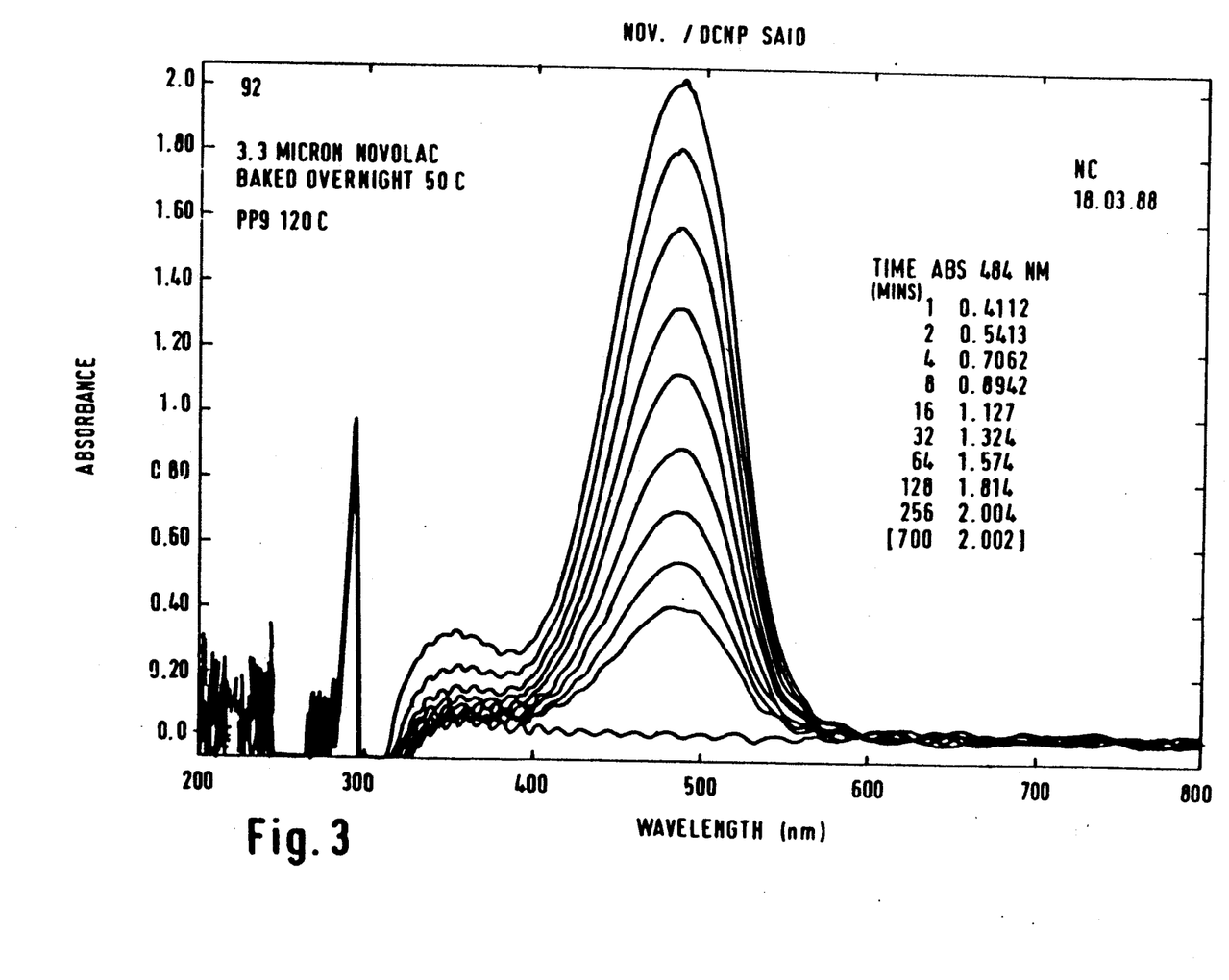

A 3.3 μm thick novolac film on glass was indiffused with DCNP under similar conditions to those used previously. The increase in dopant concentration with time was monitored at max=484 nm for DCNP. The absorbance spectra prepared in a similar way to the data in Example 17 is shown in FIG. 3. By calculating the extinction coefficient, E, for DCNP in chloroform ($E_{494}=3.8\times10^4$), the concentration of indiffused DCNP is estimated as 2.9 wt. %.

EXAMPLE 20

Figure 4:
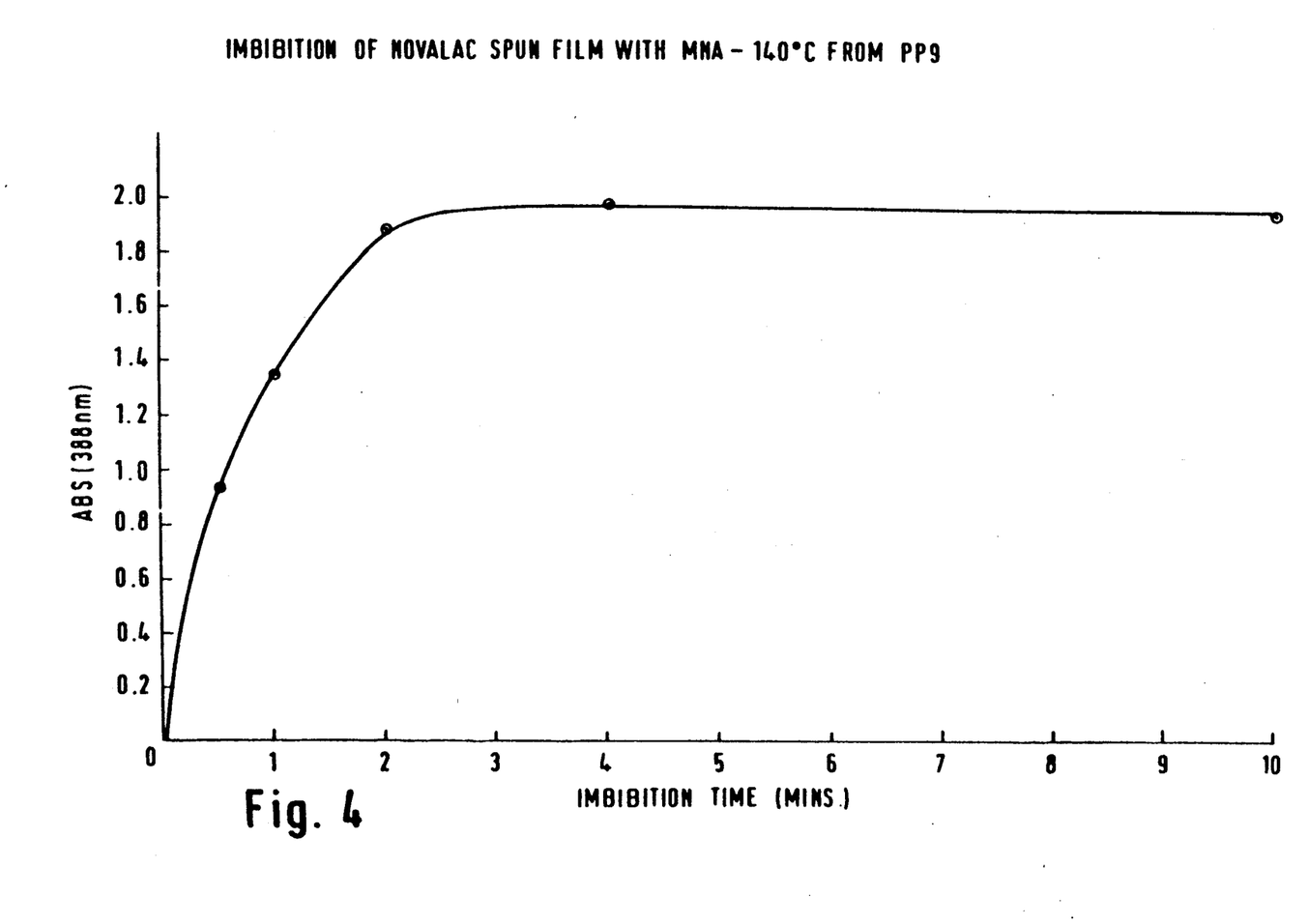
Figure 5:
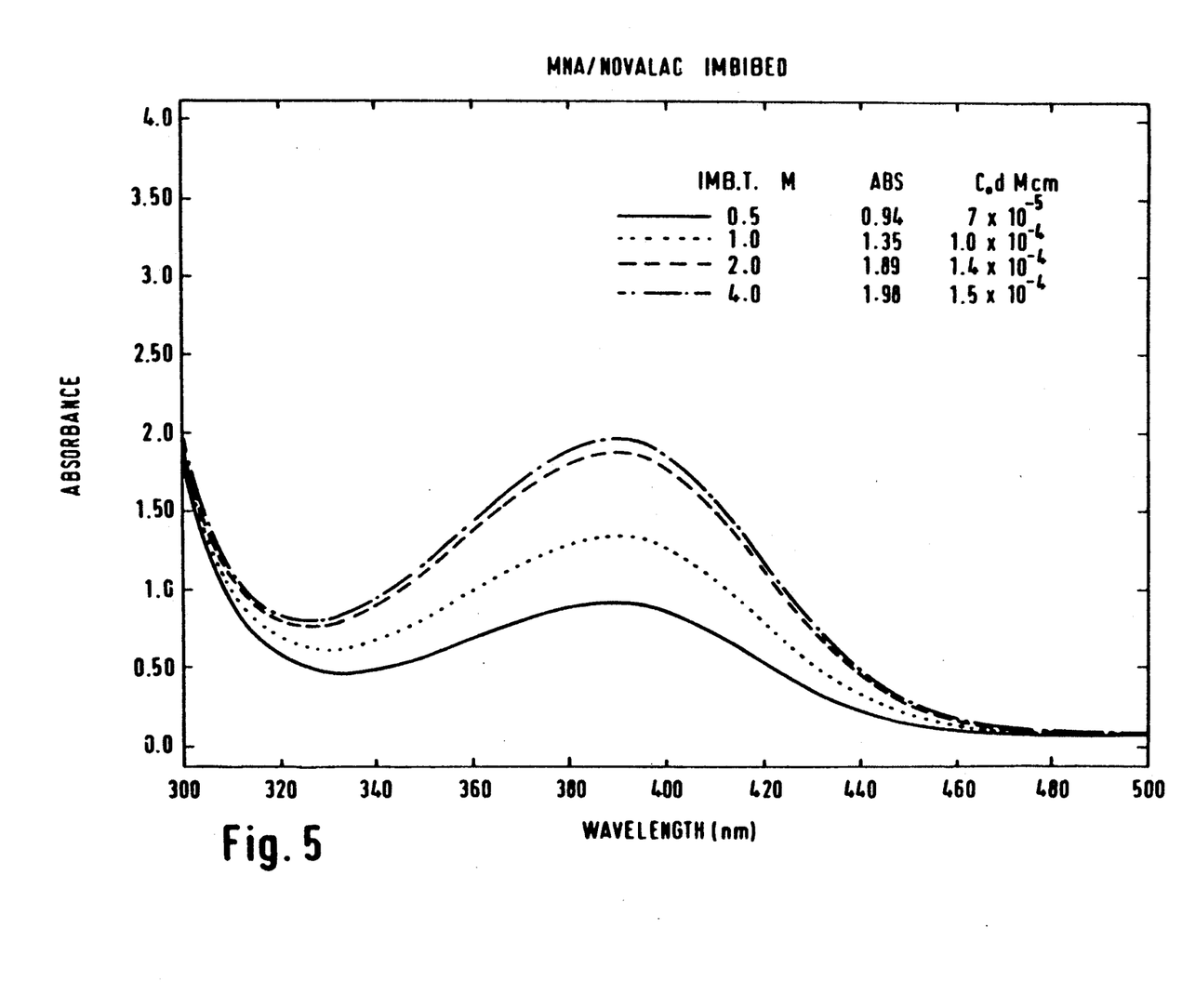

Novolac (10 g made up to 24 cm$^3$ with DMF) was coated onto a glass substrate as described in the above Examples and dried by baking at 80° C. for 1 hr. The resultant film was suspended in a solution of MNA in a perfluorinated solvent PP9 (ISC Chemicals), held at 140° C. for times between 0.5 and 10 mins. The rate of uptake is indicated in the absorbance time curve shown in FIG. 4. The absorbance/wavelength curves at four different imbibition times is shown in FIG. 5.

The concentration x thickness (Cod) data is shown in Table 2 below:

TABLE 2

| Imbibition time in minutes | Absorbance | Cod. Mcm |
|---|---|---|
| 0.5 | 0.94 | $7 \times 10^{-5}$ |
| 1.0 | 1.35 | $1 \times 10^{-4}$ |
| 2.0 | 1.89 | $1.4 \times 10^{-4}$ |
| 4.0 | 1.98 | $1.5 \times 10^{-4}$ |

EXAMPLE 21

DOPED SPUN FILM

A waveguide of 10% DAN in novolac on Schott F5 glass substrate, spun to give 1.85 μm film of refractive index 1.62. This waveguide supported 2 TE modes and 2 TM modes at 633 nm wavelength.

EXAMPLE 22

SPUN IMBIBED FILM

Imbibition of DAN into novolac film waveguide 7.0 μm thick on Schott F5 glass for 1 minute caused a refractive index change of $4.4\times10^{-3}$ throughout the film thickness. The resulting structure supported 6 TE modes at 633 nm. Imbibing DAN into the same structure for a further period of 1 min. resulted in a further increase of refractive index of $1.1\times10^{-3}$ giving a total refractive index change of $5.5\times10^{-3}$.

One specific application of channel waveguide structures of this kind is to provide optical interconnections between semiconductor components as described, for example in British Patent Application No. 85 05363 (Publication No. 2155194).

Multilayer waveguide structures can also be fabricated, e.g. by depositing one or more layers of novolac resin onto the original substrate and subjecting the structure (after curing/baking if necessary) to solvent indiffusion treatment prior to depositing the subsequent layer of resin or other polymer. Spin-coating or dip-coating techniques are suitable procedures for depositing two or more superposed films.

As indicated above, channel waveguide structures can be produced by standard photolithographic methods to define desired patterns on the plastics substrate. Such methods can be used to define windows of the order of 3 to 7 μm in a metallic mask (e.g. aluminium) evaporated onto the resin film. Solvent indiffusion into the substrate followed by removal of the aluminium leaves well-defined channel waveguides. Metallic layers deposited onto the resin film by photolithography or other standard techniques need not be removed after solvent indiffusion but can be used as a means for applying an electrical field to the indiffused dopant causing alignment of polar dopant molecules.

This last-mentioned technique is particularly valuable in the production of optically non-linear waveguide structures which makes use of the large second and third order susceptibilities and intensity dependent refractive indices of many organic molecules. Waveguides fabricated with such organic molecules will be capable of performing a wide range of non-linear functions. They can take the form of the planar structures and the numerous channel waveguide structures, described above, as well as multilayer and distributed feedback structures.

Organic, non-linear waveguide devices formed by solvent indiffusion can perform a wide range of high speed optical signal processing functions including optical bistability, logic gating, inversion, optical limiting, pulse shaping, correlation and convolution by degenerate four-wave mixing, phase conjugation, harmonic generation, frequency mixing, frequency shifting and high speed all optical switching. Devices performing these functions will have widespread applicability in the fields of optical computing, signal processing and high data rate optical communications systems. Details of construction and operation of optical switching devices can be found in the review paper of G. I. Stigerman and C. T. Seaton published in Journal Appl. Phys. 58, R57 (1985).

The production of waveguides has been described above with particular reference to the formation of a surface region of increased refractive index in a layer or matrix. However, it is also possible to utilize the techniques described in this specification to form a region of decreased refractive index, e.g. by solvent assisted indiffusion into a novolac film and to produce waveguide structures for example by masking selected areas of the film.

We claim:

1. A method of forming an optical waveguide which comprises coating a transparent substrate with a film of a novolac resin, heating the film to form a hard layer and effecting imbibition of an optical modifying material into the film by contacting the hardened film with a solution of the optical modifying material, said optical modifying material having the effect of raising the refractive index of the film.

2. A method according to claim 1, wherein the solution is a saturated solution of the optical modifying material.

3. A method according to claim 1, wherein the optical modifying material is dissolved in a perfluorinated hydrocarbon solvent.

4. A method according to claim 1, wherein the film of novolac resin is deposited on the substrate by spin-coating.

5. A method according to claim 1, wherein the initial film of novolac resin contains an optical modifying material and the hardened film is contacted with a solution of the same or another optical modifying material.

6. A method of producing a channel waveguide which comprises the steps of:

(a) coating onto a transparent substrate a film of a novolac resin and causing the film to dry to form a hard layer, (b) depositing on the resulting hard layer a metallic mask defining a desired pattern of metal-free channels, and (c) effecting imbibition of an optical modifying material into the film in the region of said channels by contact with a solution of the optical modifying material.

* * * * *